United States Patent
Zhang et al.

(10) Patent No.: US 9,117,068 B1
(45) Date of Patent: *Aug. 25, 2015

(54) PASSWORD PROTECTION USING PATTERN

(71) Applicants: Lei Zhang, Nanjing (CN); Zhiwei Zhu, Shangqiu (CN)

(72) Inventors: Lei Zhang, Nanjing (CN); Zhiwei Zhu, Shangqiu (CN)

(73) Assignee: Trend Micro Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,314

(22) Filed: Sep. 25, 2013

(51) Int. Cl.
*G06F 21/00* (2013.01)
*G06F 21/45* (2013.01)

(52) U.S. Cl.
CPC ..................... *G06F 21/45* (2013.01)

(58) Field of Classification Search
CPC ........................................ G06F 21/45
USPC ............................ 726/18; 713/184
See application file for complete search history.

(56) References Cited

U.S. PATENT DOCUMENTS

| | | | | |
|---|---|---|---|---|
| 5,008,847 | A * | 4/1991 | Lapeyre | 708/146 |
| 5,559,961 | A * | 9/1996 | Blonder | 726/18 |
| 6,209,104 | B1 * | 3/2001 | Jalili | 726/18 |
| 7,444,517 | B2 * | 10/2008 | Dayan et al. | 713/184 |
| 7,468,805 | B2 * | 12/2008 | Lo et al. | 358/1.18 |
| 7,844,825 | B1 * | 11/2010 | Neginsky | 713/184 |
| 8,145,912 | B2 * | 3/2012 | McLean | 713/182 |
| 8,321,930 | B1 * | 11/2012 | Taylor et al. | 726/17 |
| 8,868,919 | B2 * | 10/2014 | Barton et al. | 713/182 |
| 8,884,885 | B2 * | 11/2014 | Liu et al. | 345/173 |
| 8,931,060 | B2 * | 1/2015 | Bidare | 726/4 |
| 2003/0140258 | A1 * | 7/2003 | Nelson et al. | 713/202 |
| 2004/0010721 | A1 * | 1/2004 | Kirovski et al. | 713/202 |
| 2004/0073809 | A1 * | 4/2004 | Wing Keong | 713/201 |
| 2004/0139331 | A1 * | 7/2004 | Sanai et al. | 713/184 |
| 2004/0230843 | A1 * | 11/2004 | Jansen | 713/202 |
| 2005/0044425 | A1 * | 2/2005 | Hypponen | 713/202 |
| 2005/0160297 | A1 * | 7/2005 | Ogawa | 713/202 |
| 2005/0246138 | A1 * | 11/2005 | Park | 702/189 |
| 2006/0174339 | A1 * | 8/2006 | Tao | 726/18 |
| 2007/0001950 | A1 * | 1/2007 | Zhang et al. | 345/88 |
| 2007/0157299 | A1 * | 7/2007 | Hare | 726/9 |
| 2008/0098464 | A1 * | 4/2008 | Mizrah | 726/5 |
| 2008/0235788 | A1 * | 9/2008 | El Saddik et al. | 726/18 |
| 2008/0244700 | A1 * | 10/2008 | Osborn et al. | 726/2 |
| 2009/0044282 | A1 * | 2/2009 | Govindaraju | 726/27 |
| 2009/0091530 | A1 * | 4/2009 | Yoshida | 345/156 |

(Continued)

OTHER PUBLICATIONS

Office Action in U.S. Appl. No. 13/680,834, dated Apr. 22, 2014.

(Continued)

*Primary Examiner* — David Garcia Cervetti
(74) *Attorney, Agent, or Firm* — Beyer Law Group LLP

(57) ABSTRACT

A user creates a pattern in a two-dimensional grid by entering a password and enters a user name. This user name, password and pattern are stored locally on a computing device or are transmitted to a remote computer server for later authentication. Upon authentication, a choice of input grids is displayed. The user chooses a grid, enters the password into the grid in the form of the pattern, and also enters the user name. The computer retrieves the previously stored pattern and password with the user name. A match with the stored password indicates authentication. Each cell of the input grid may contain more than one symbol of the password. The input grid may also be filled with random characters to improve security. A grid may be a rectangular matrix, a circular region, an asymmetrical region, or other.

20 Claims, 15 Drawing Sheets

Authentication Overview

(56) References Cited

U.S. PATENT DOCUMENTS

| | | | |
|---|---|---|---|
| 2009/0210939 A1* | 8/2009 | Xu et al. | 726/19 |
| 2009/0235197 A1* | 9/2009 | Chen et al. | 715/780 |
| 2009/0241185 A1* | 9/2009 | Waterland | 726/18 |
| 2009/0249235 A1* | 10/2009 | Kim et al. | 715/765 |
| 2009/0284344 A1* | 11/2009 | Craymer et al. | 340/5.54 |
| 2010/0024022 A1* | 1/2010 | Wells et al. | 726/7 |
| 2010/0281526 A1* | 11/2010 | Raghavan | 726/7 |
| 2011/0016520 A1* | 1/2011 | Cohen et al. | 726/19 |
| 2011/0099505 A1* | 4/2011 | Dahl | 715/773 |
| 2011/0154035 A1* | 6/2011 | Yao et al. | 713/168 |
| 2011/0307952 A1* | 12/2011 | Xie | 726/18 |
| 2012/0005483 A1* | 1/2012 | Patvarczki et al. | 713/182 |
| 2012/0066650 A1* | 3/2012 | Tirpak et al. | 715/863 |
| 2012/0102551 A1* | 4/2012 | Bidare | 726/4 |
| 2012/0252409 A1* | 10/2012 | Cao | 455/410 |
| 2013/0009987 A1* | 1/2013 | Takishita | 345/619 |
| 2013/0097697 A1* | 4/2013 | Zhu et al. | 726/18 |
| 2013/0133053 A1* | 5/2013 | Akunuru | 726/7 |
| 2014/0289870 A1* | 9/2014 | Selander et al. | 726/28 |
| 2014/0359300 A1* | 12/2014 | Shirakawa | 713/183 |

OTHER PUBLICATIONS

Office Action in U.S. Appl. No. 13/680,834, dated Jul. 29, 2014.
Office Action in U.S. Appl. No. 13/680,834, dated Nov. 19, 2014.
Notice of Allowance in U.S. Appl. No. 13/680,834, dated Apr. 15, 2015.

* cited by examiner

Authentication Overview

FIG. 5A  FIG. 5B  FIG. 5C
|   |   | 00 |
|---|---|----|
|   | n |    |
| e7|   |    |
240
| 1 | 1 | 1 |
|---|---|---|
| 2 | 2 | 2 |
| ! | ! | ! |
244
|   | One! |     |
|---|------|-----|
|   |      |     |
|   |      | cHe |
248
User Input Examples User Input Example

|   | 1 | 2 | 3 | 4 | 5 |
|---|---|---|---|---|---|
| 1 | 5 | 2 | 3 | 4 | 5 |
| 2 | F | 3 | 6 | A | 1 |
| 3 | A | F | F | F | F |
| 4 | 3 | W | O | R | D |
| 5 | W | 6 | D | 1 | 2 |

520

| User Name | | 530

Input User Interface

Alternative Grid

Alternative Grid Choices

Encoding Example

PASSWORD PROTECTION USING PATTERN

FIELD OF THE INVENTION

The present invention relates generally to use of computer passwords. More specifically, the present invention relates to more securely protecting such passwords using an associated pattern.

BACKGROUND OF THE INVENTION

As is known, computer passwords are used to authenticate an individual for a wide range of activities including logging on to a computer, gaining access to a mobile telephone, signing in to a Web site, etc. Thinking up appropriate passwords and then trying to remember them can be a constant effort for a computer user as well as troublesome.

Complex passwords—preferred by administrators and online services—can be forgotten more easily by a user, or may be written down by a user in a discoverable location. Choosing a simple password makes it easier for the user to remember it, but then it may not be secure. Simple passwords can more easily be "hacked" by an unscrupulous person who then gains access to the user's account. Hackers will often use a "brute force" attack in order to crack a simple password.

Traditional authentication techniques only allow users to type in a password into a one-dimensional input box, which generates a sequential string according to what the user has input into the box. These traditional techniques are less secure and require the users to input longer and varied passwords in order to achieve greater security. One advanced technique disclosed in U.S. application Ser. No. 13/680,834 (which is hereby incorporated by reference) uses a two-dimensional grid into which a pattern or password is input. Even so, improvements upon the security provided by this technique would be desirable.

Therefore, while a user may wish to choose a simple password, often he or she is forced into choosing a complex one-dimensional password because of the requirements of the system administrator or of the online service. It would be desirable to provide further protection for passwords in general and for simple passwords as well, so that even simple passwords cannot be hacked.

SUMMARY OF THE INVENTION

To achieve the foregoing, and in accordance with the purpose of the present invention, a technique is disclosed that uses an associated pattern in order to further protect any password. In addition to using an associated pattern, multiple symbols may be entered into each cell of the grid, instead of only a single symbol. Further, the user may optionally be presented with any number of grids in order to establish a password or to authenticate himself or herself. A proper authentication, then, may require not only choosing the correct grid, but also entering the correct symbols into the correct cells of the grid. Thus, higher security is achieved with less user input.

In one embodiment, a user's identity is established using a pattern and password. A grid or other two-dimensional area (such as a matrix) is presented to the user and the user generates a pattern. A set of coordinates or matrix elements that define the generated pattern may then be developed. The user enters a user name (or other unique user identifier) and an associated password. This user name, the password and the set of coordinates for the pattern are then stored locally on a computing device or are transmitted over a network to a remote computer server for later authentication of the user. The image of the pattern may be transmitted for later use, or the set of coordinates of the pattern may be transmitted. The password may be entered separately from the pattern by the user, or the password may be entered directly into the grid in order to form the pattern.

In a second embodiment, a user attempts to be authenticated. An interface is displayed to the user that includes an input grid or input matrix. The user enters his or her password into the grid in the form of the pattern that the user has previously established. The user also enters his or her user name or other unique identifier. Alternatively, the user draws or otherwise indicates the previously stored pattern on the input grid and enters his or her password separately from the grid. The user name, pattern and password are then submitted to a local computing device or transmitted to a remote computer server for authentication.

In a third embodiment, a local computing device or a remote computer server authenticates the user using a received pattern, password and user name. The received grid or matrix includes the password that forms the pattern, or, the pattern may be received separately from the password. Using the user name, the computer retrieves a previously stored pattern (or its coordinates) and the previously stored password. The input password and pattern are then compared to the previously stored password and pattern and a match indicates that the user has been authenticated.

One advantage of the present invention is that a brute force attack on a password becomes extremely difficult. Considering the prior art one-dimensional password input field, and assuming that the password character space is M and that the maximum password length is N, this means that a brute force attack on the prior art input field may need to attempt a maximum of $M^N$ times in order to achieve success. The average attack on the prior art would then take $M^N/2$ attempts. Using the techniques disclosed in U.S. application Ser. No. 13/680,834, and assuming that a matrix having dimensions of length L and width W is used, a brute force attack will need to attempt a maximum of $M^{(L*W)}$, with $M^{(L*W)}/2$ being the average number of attempts needed. Using the present invention, however, assume that X grids are provided to a user, the grids having a total of T cells, and keeping in mind that each cell may include multiple symbols, a brute force attack will need to attempt a maximum of $M^{(X*T*N)}$, with $M^{(X*T*N)}/2$ being the average number of attempts needed. In the simple case in which only one grid is used, the average number of attempts is still $M^{(T*N)}/2$.

Assuming that the maximum password length is N=9, this means that a brute force attack on the prior art would only need a maximum of $M^9$ attempts, and that a brute force attack upon a password protected by application Ser. No. 13/680, 834 (assume L=W=5) would need up to $M^{25}$ attempts. Using the present invention, however, and assuming that seven grids are provided (X=7), the grids having a total of twenty-five cells (T=25), a brute force attack may need to attempt a maximum of $M^{1575}$ tries!

BRIEF DESCRIPTION OF THE DRAWINGS

The invention, together with further advantages thereof, may best be understood by reference to the following description taken in conjunction with the accompanying drawings in which:

FIGS. 5A, 5B and 5C are other examples of user input within a grid in which a cell may have multiple symbols.

FIG. 9 illustrates an example input user interface having an input matrix and a user name input field.

DETAILED DESCRIPTION OF THE INVENTION

As mentioned above, associating a particular pattern with a user password provides much greater security for that password. When authenticating, the user is asked to supply not only his or her password, but also the associated pattern. If the password and associated pattern match what has been previously stored then the user is authenticated. Establishing the password and pattern, and eventually authenticating the user, may take place upon any standalone computing device such as a laptop computer, desktop computer, tablet computer, mobile telephone, etc. In addition, any of these computing devices may be used not only to establish a password and pattern on a remote computer server, but also to authenticate the user to that remote computer server. For example, these devices may be communicating over a local area network, wide area network, or the Internet (via a wired or wireless connection) in order to communicate with the remote computer server, such as a cloud server. In particular, the present invention may be used to authenticate a user using a local computing device to a remote in-the-cloud server associated with an online service, although the invention is not so limited.

Invention Overview

Figure 1:
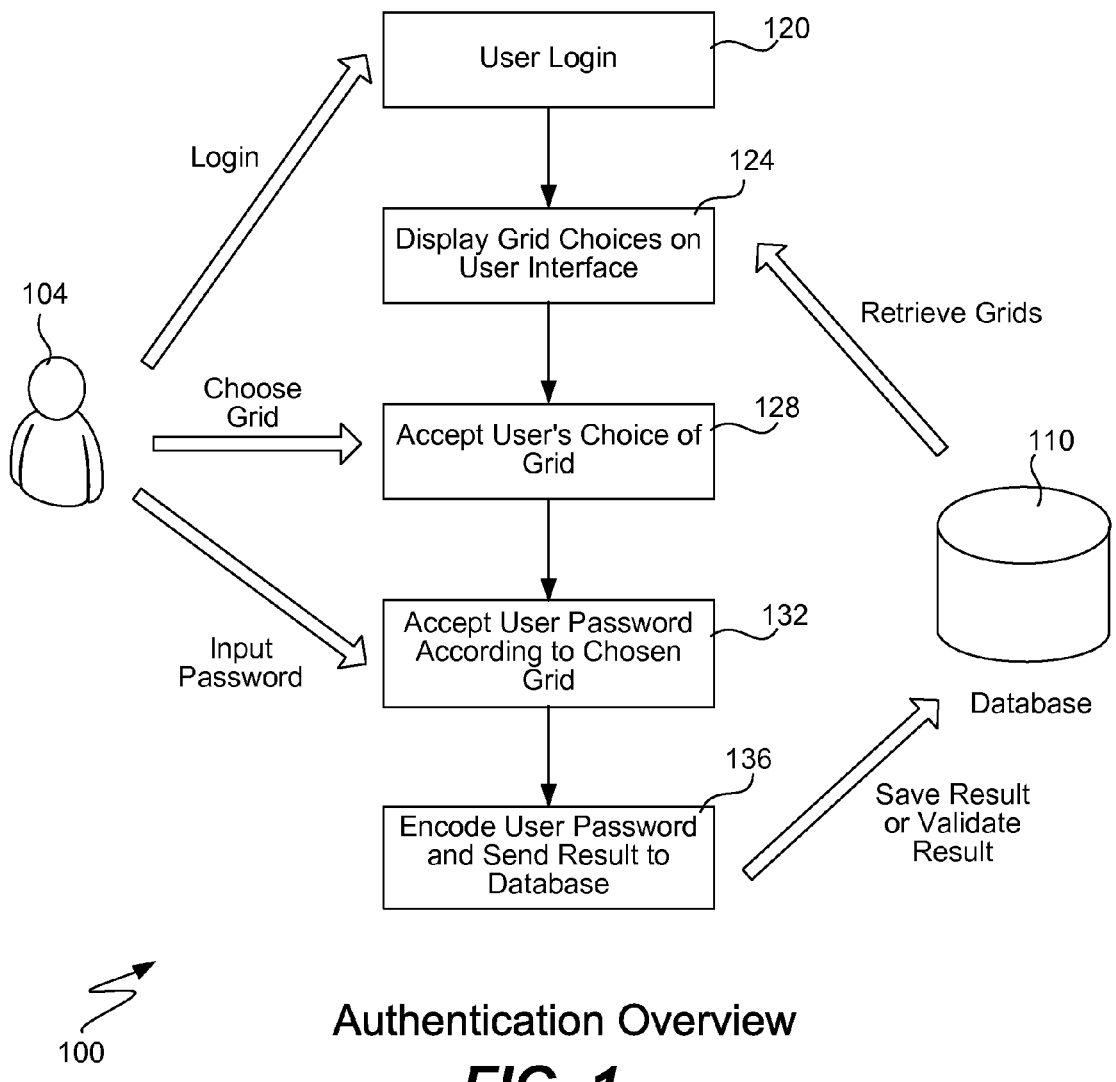
FIG. 1 is an overview of one embodiment of the invention.

FIG. 1 is an overview of the present invention, showing a flow diagram and user interaction in order to establish a password for a user and to authenticate the user. User 104 may be interacting with any of the computing devices mentioned above, and the database 110 may be present on the user's computing device or on a remote computer server. In general, steps 120-136 may take place upon the user's computing device, although other processing may take place on the remote computer server.

In a first step 120 the user may register by providing a user name or attempt to log in to an existing account. A choice of possible grids is provided by the database on a user interface in step 124 when a password is established and when a user is authenticated. In step 128 the user selects one of the grids and then in step 132 the user enters his or her password into the chosen grid. In step 136 the password entered into the grid is encoded in any suitable format and this format is saved in the database along with the user name (in the case of establishing a password the first time), or, the encoded password is compared against an existing record in the database in order to validate that the user has entered the correct password in the correct pattern in the correct grid. The database 110 may be a local database on the user's computing device or the database may be located remotely in the cloud.

Establish Pattern and Password

Figure 2:
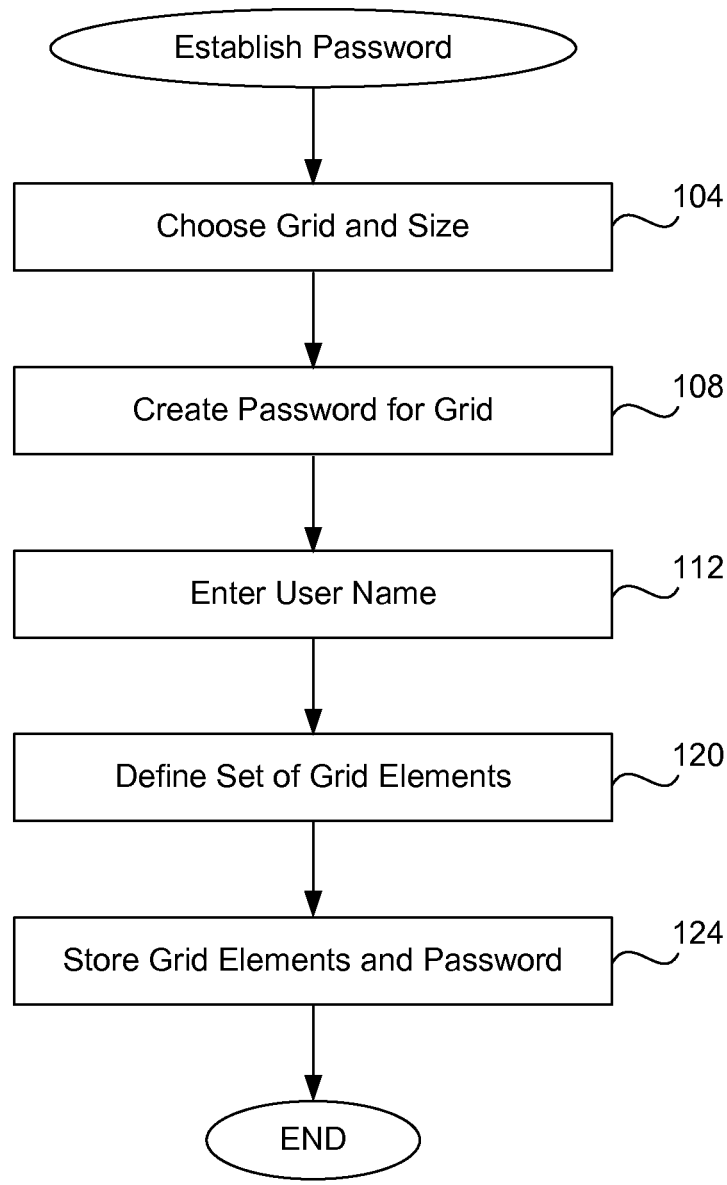
FIG. 2 is a flow diagram describing one embodiment by which a password, grid and associated pattern are established for a computer user.
Figure 3A:
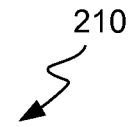
FIG. 3A shows a grid that may be used by the user to enter a pattern to be associated with his or her password.

FIG. 2 is a flow diagram describing one embodiment by which a password, grid and associated pattern are established for a computer user. In step 104 a particular grid is chosen by the user, is selected by the system, or is generated automatically by default, so that the user may enter his or her password to form a particular two-dimensional pattern. For example, FIG. 3A shows a 5×5 matrix 210 that may be used by the user to enter his or her password (or pattern to be associated with his or her password). Of course, matrix 210 is only one example; the two-dimensional grid may be of any size or type, and may contain any number of cells, although the size of the grid will be restricted by the size of the user's display screen, and should be large enough so that the user can enter his or her password or pattern. The size of the grid used may be a default size set by the operating system of the computing device, a system administrator, a particular online service needing a password, or other entity. Or, it is also possible that the user is prompted by the system to input a desired grid size for his or her use. In general, a larger grid with more cells will provide greater security, although a smaller grid may fit more easily on the user's display screen. And, although a rectangular matrix as shown, any shaped grid having cells may be used to define a password or pattern in two-dimensional space.

Figure 11A:
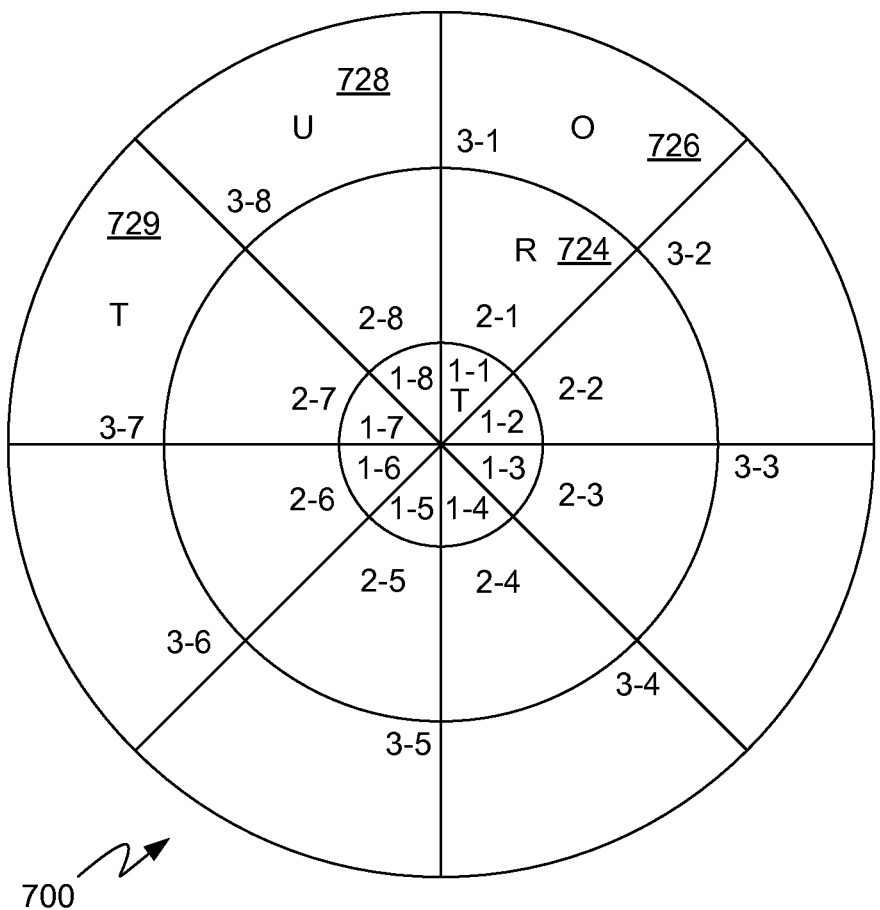
FIGS. 11A and 11B show alternative grids that may be used with embodiments of the invention.
Figure 11B:
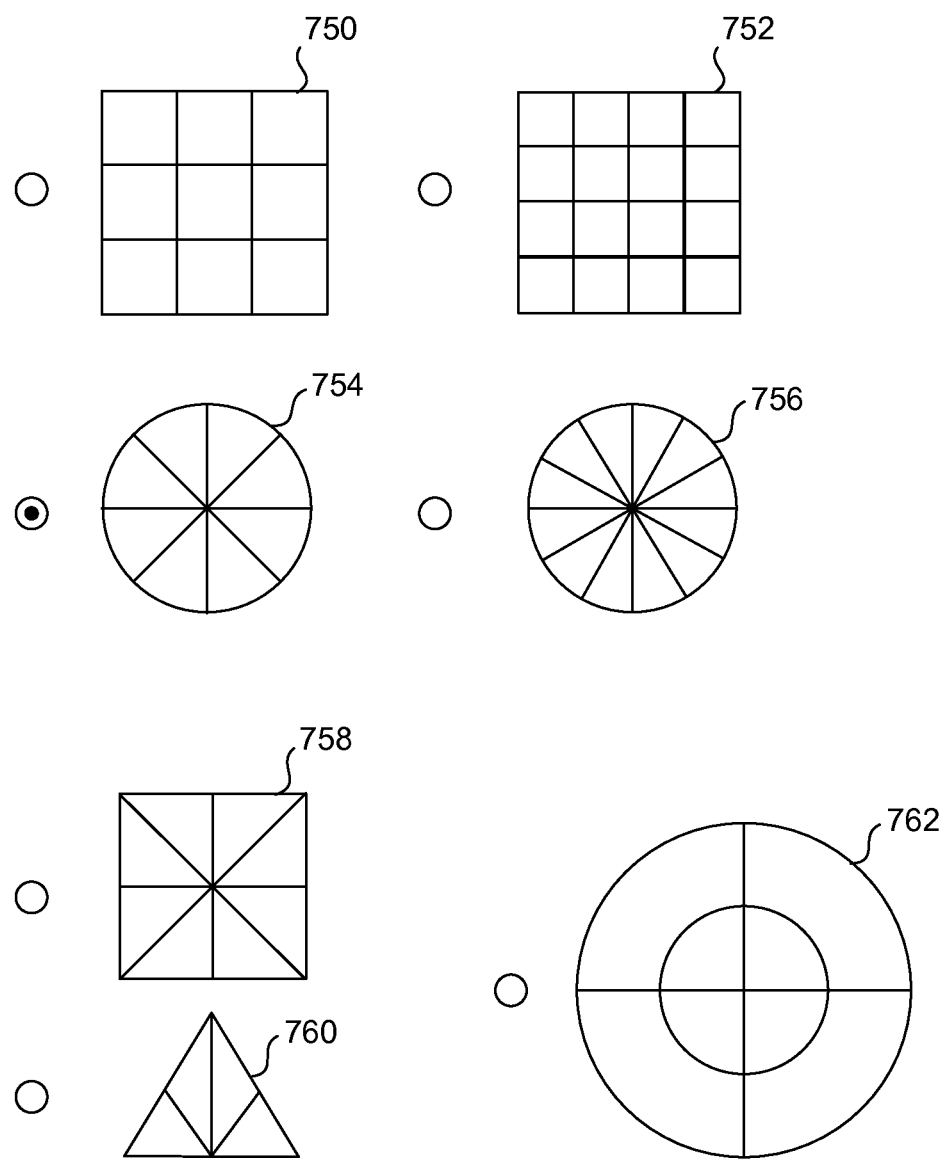

FIG. 11B illustrates alternative grid choices 750-762. In this embodiment, the computing device (or remote computer server) presents to the user any number of grids that may be used for entry of his or her password. Of course, there may be a single default grid that is always presented, and the user may be allowed to choose its size. As shown in this example, a number of grids are presented and the user has selected grid 754 by clicking its associated button. This grid has eight cells; other grids may have any number of cells for entry of a password or pattern; for example, grid 760 as four cells. Once a grid is chosen or selected in this embodiment, control may move to step 108.

Figure 3B:
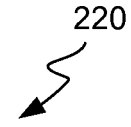
FIG. 3B shows one example of a pattern found within a grid.

In step 108 a password is created for the chosen grid. The password may be entered directly into the grid, may be associated with a pattern that is entered into the grid, or may be associated with the cells of the grid in any other suitable manner A given cell of the grid may contain a single symbol of the password or a cell of the grid may include any number of symbols that form part of the password. Accordingly, FIG. 3A illustrates that the user's password "CATHERINE" has been entered into matrix 210 in a particular manner, in this case, one character per cell. FIG. 3B illustrate the pattern 224 formed by entry of the user password above in matrix 210.

In an alternative embodiment, instead of allowing the user to form a pattern by first entering his or her password into the grid, a pattern may be generated first by the system or by the user, thus allowing the user to next enter his or her password following the generated pattern. One way to generate a pattern is to provide a user with a number of templates, or proposed patterns, and then let the user choose a pattern. Of course, the greater the number of templates, the greater the security. Or, the user may select from any of a number of characters, numbers, symbols, punctuation, etc., that are commonly found and available within a computer software program for inserting into a text document. The user may select this character or symbol by clicking on the character or symbol on a graphical user interface on his or her display screen. In addition, it is also possible for the user to draw his or her preferred pattern on a computing device having a touchscreen using his or her finger, stylus, mouse, etc. Or, the user may use his or her computer mouse or other input device to individually select matrix elements in order to produce his or her desired pattern. Pattern 224 is similar to the character "L" and may have been chosen by the user from a set of templates, by clicking on the letter, by drawing with his or her finger, etc. This pattern may also be generated on a blank display screen, or may have been input directly on to the displayed matrix 220.

Figure 4A:
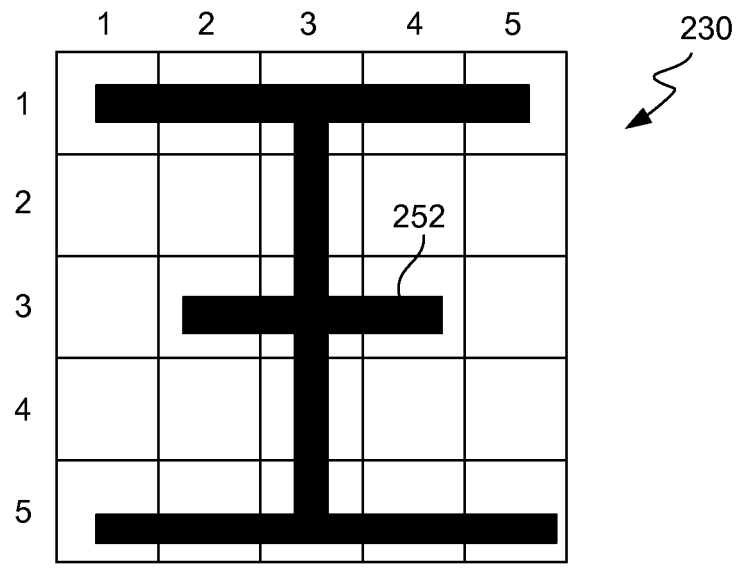
FIGS. 4A and 4B are examples of a pattern within a matrix.
Figure 4B:
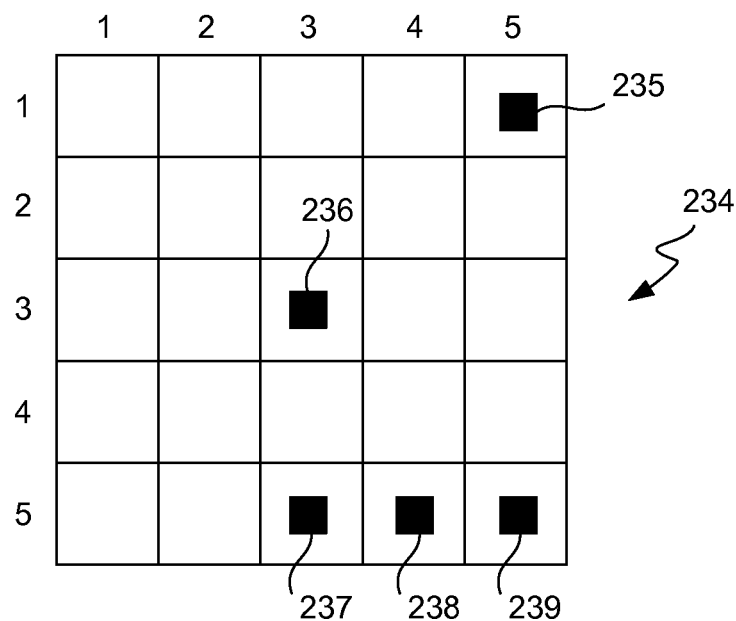

FIGS. 4A and 4B provide other examples of patterns that may be formed by entry of the user's password into a particular grid (i.e., entry of one or more symbols into each cell of the grid) and patterns that may be generated automatically. FIG. 4A is a particular Chinese character 232 in a grid 230. FIG. 4B is an example of a random pattern chosen by the user within a grid 234. As shown, this pattern includes five cells 235-239; this pattern may be formed by entry of one or more symbols into each of these cells. Thus, the pattern chosen by the user need not be a recognized character or symbol, but may be any random selection of cells within a two-dimensional matrix or other two-dimensional grid. In fact, it is not strictly necessary that the user choose his or her pattern first; the computing device may also randomly select a character or symbol to be used as a pattern, or the user creates a pattern by entry of symbols into the grid.

FIGS. 5A, 5B and 5C illustrate more examples of patterns formed in a grid by entry of symbols into cells. In grid 240 the user has created a diagonal pattern by entry of particular symbols in a diagonal line. In grid 244 the user has input multiple symbols into each cell of the grid, each row containing the same symbols, thus forming a pattern which is essentially the shape of the entire grid. In grid 248 the user has input multiple symbols into two cells of the grid thus forming a random pattern.

Figure 6:
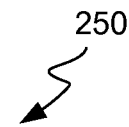
FIG. 6 shows yet another embodiment by which the user may generate a particular pattern for use with his or her password.

FIG. 6 shows yet another embodiment by which the user may generate a particular pattern by entry of his or her password. In this example, the user delineates a pattern by entering his or her chosen password in particular matrix cells using one or more characters per cell. In this example, the pattern of grid 250 has been delineated by the user by entering his or her password "9987654321" in particular matrix cells in order to define the pattern. It is also possible for the user to select, draw, or be assigned, a pattern such as pattern 224, and then type in his or her password superimposed over pattern 224 in order to enter the user password in that fashion. Also, the password need not be entered into a blank matrix, but the remaining portion of the matrix (aside from the entered password) may have randomly assigned characters, numerals, symbols, etc. When transmitting the pattern of FIG. 6 to the computing device or to a remote server, the cells forming the password may have a special flag associated with each one in order to indicate that these cells contain the password.

Figure 7:
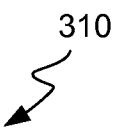
FIG. 7 is an example user interface.

In step 112 the user is prompted to input his or her user name. Of course, the user name may be entered at the beginning of this procedure, at the end of this procedure, or may be selected by default by the computing device. Preferably, each user name on a computing device for use with a set of applications is unique, thus allowing encoded password results to be stored with a unique user name. FIG. 7 is an example user interface 310 showing entry of a user name.

In step 120, once a password has been entered using any of the above techniques, the computing device (or remote server) determines which are the set of grid elements that hold the password and define the pattern. The information that defines how the password is represented within the grid may be defined and stored in a database in a variety of manners. In one embodiment, each grid is uniquely identified and the symbols within it are stored in records in a database.

Figure 12:
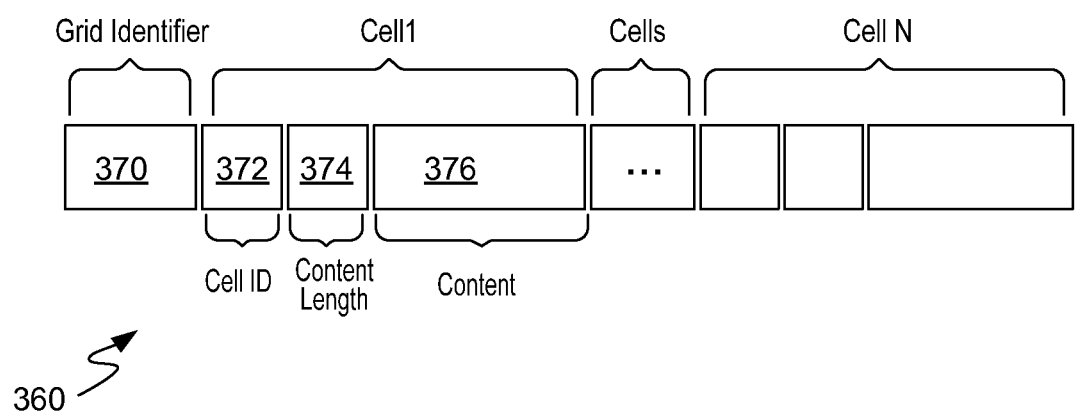
FIG. 12 illustrates an encoding example.

FIG. 12 illustrates an encoding example 360 in which a grid, its cells and contents are stored within a record of a database. As shown, each record includes a grid identifier 370 that uniquely identifies a particular grid within the database that has been used to establish a password. For example, grid 754 of FIG. 11B has a unique identifier that distinguishes it from the other grids shown. The grid identifier is followed by information defining any number of cells, each cell including a cell identifier 372, the content length of that cell 374, and the actual contents of that cell 376. The elements of record 360 can be separated by ':' or ';' or any other suitable characters or delimiters. Here is an example of the encoding of particular user input. Assume that the user chooses a grid having a unique identifier of "001," and then inputs "abc" in a cell whose cell identifier is "005" and "fda54@" in a cell whose cell identifier is "007." Thus, the user's password is abcfda54@. Of course, the user may also consider that his password is "fda54@abc" because the order in which the symbols of the password are entered is not important, only the location of where the symbols are entered. (For example, the password of matrix 240 may be considered to be "e7nOO," or "OOne7," or even "nOOe7.")

Using ";" as delimiter in this example, the encoded result will be: 001;005;3;abc;007;6;fda54@. Thus, this encoded result may be stored in a record in the database, may be stored as a text string in any suitable location, or may be stored in some other fashion. Of course, other encoding schemes may also be used that associate symbols of a password with a particular cell of a particular grid. In this example, cells that do not have a password entry are simply omitted from the encoded result. In other embodiments, cells having no symbols entered may be listed as being blank, or as having a length of zero, etc. This simple encoding example may be used by a single user for authentication with a single operating system or single application. In other embodiments (not shown in this figure), record 360 may also have associated with it a unique user name used to identify with which particular user the record corresponds, and may also have associated with it an application name thus allowing the record to be associated with a particular software application. Thus, in more complex embodiments record 360 will also include a field for the user name and a field for the application name. Other information concerning the user or the application may also be included.

Other schemes for representing a password and associated pattern within a particular grid may also be used. For example, pattern 224 is defined by the matrix elements: (1, 1), (2, 1), (3, 1), (4, 1), (5, 1), (5, 2), (5, 3), (5, 4), (5, 5). Of course, any other coordinate scheme for defining a particular pattern within a two-dimensional space may be used and is not limited to rectangular matrices, Arabic numerals, square matrix elements, etc. This set of grid elements may be determined by the local computing device on which the password is entered, or may be determined by a remote computer server after the password and pattern have been transmitted to that server. This set of grid elements has a particular order, although it is not necessary for the user to enter his or her password in any particular order. For example, password 224 may be entered from right-to-left and from bottom-to-top instead of the other way around. Or, a password in the shape of pattern 232 may be entered using horizontal and vertical strokes in any sequence. It is even possible for the user to select the individual matrix elements of pattern 234 in a random order in order to enter the password. Typically, though, the set of defined grid elements will have a particular order and may use any convention desired. In the given example, the convention is that grid elements are listed within the set by reading the password from top-to-bottom and from left-to-right. Using this example, a matrix element (1,1) may be rewritten as (1,1,C) in order to indicate not only the matrix element but also a symbol of the password stored therein.

Once the password and user name have been entered, then in step 124 the defined set of grid elements (including the password) and the user name may be stored in an appropriate location of the computing device or of the remote computer server. For example, the computing device may store this information locally within persistent storage, or the remote computer server may store this information in its associated database. Once this information has been stored, it may be used in the future to authenticate the user in a subsequent attempt to login to the computing device while using the pattern and password that are purported to be from that user.

The set of possible numerals, letters, characters and symbols that are allowed for the password form the password space. For the purposes of this application, the term symbol refers to any numeral, letter, character, punctuation mark or symbol that may be entered by a user into a computing device to form a password. The term alphanumeric character is defined less broadly, and means any numeral, letter, character, or punctuation mark commonly found on a computer keyboard or other input screen that is typically entered by a user as part of a password. Also referred to above is the user name. As known in the art, a user's user name is a string of letters, characters, numerals, etc. that identify a particular user. As used herein, a user name may be any suitable identifier that uniquely identifies a particular user within a particular computing system or within an online service.

Authenticate User

Figure 8A:
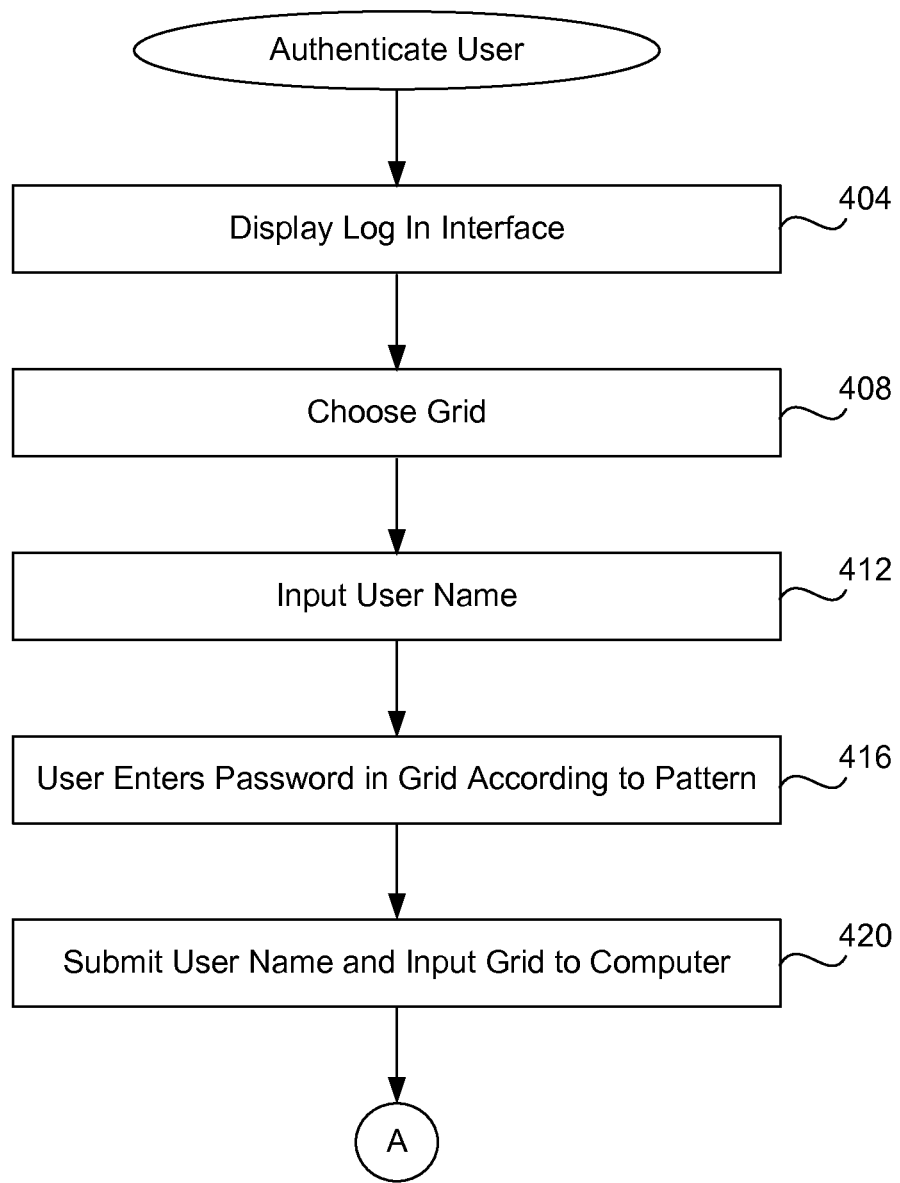
FIGS. 8A and 8B are a flow diagram describing one embodiment by which a user is authenticated using a password and an associated pattern.
Figure 8B:
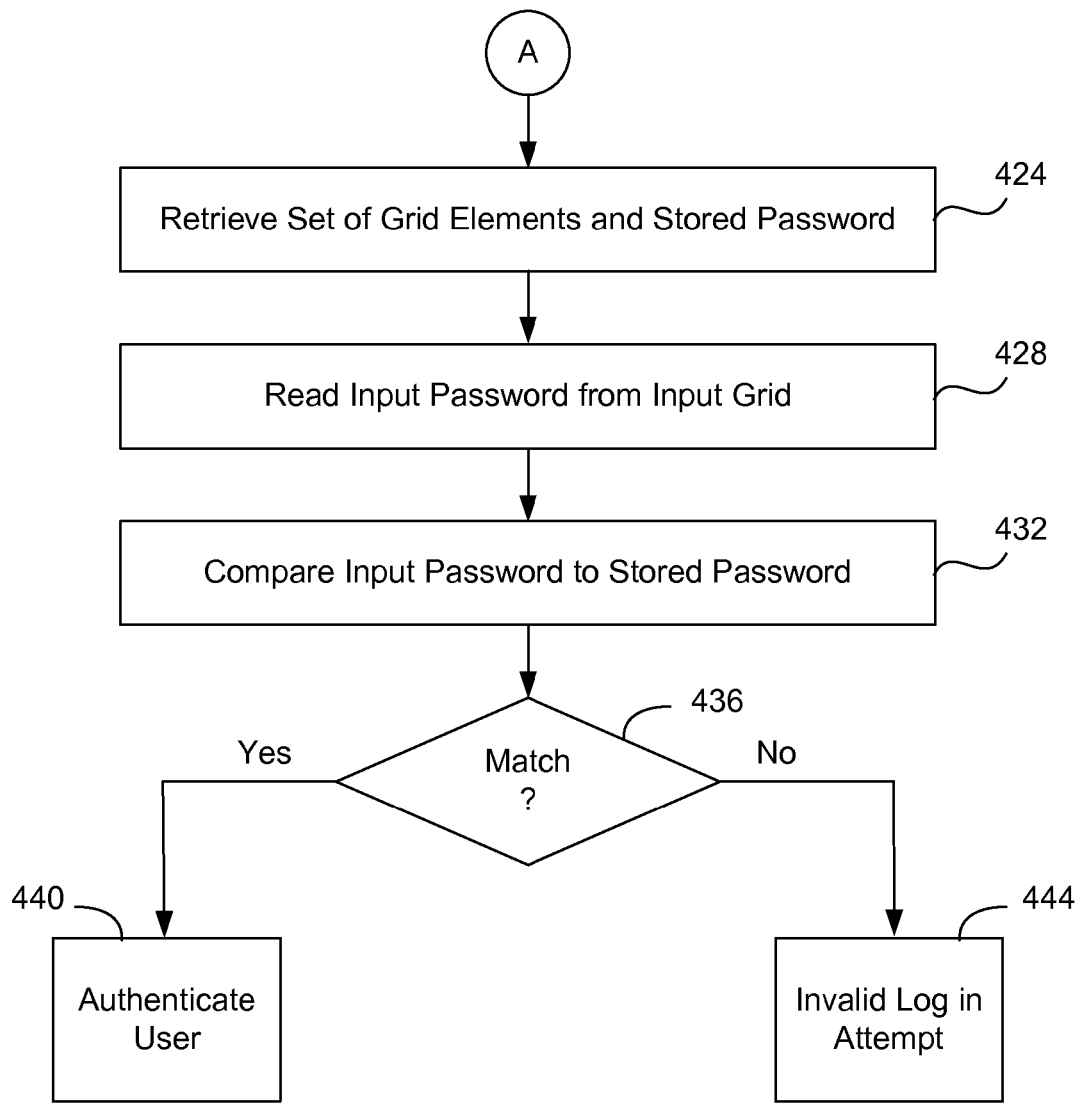

FIGS. 8A and 8B are a flow diagram describing one embodiment by which a user is authenticated using a password and an associated pattern. As described above, the user has previously generated a pattern and an associated password which have both been stored in conjunction with a user name (and perhaps an application name) on a local computing device or remotely on a computer server.

In step 404 the local computing device displays a login interface for the user which has been generated either locally or at a remote computer server. The interface may be in any suitable form and may, for example, appear as shown in the interface 310 where the user is prompted for a user name, or, where the user is prompted for a user name and a selection of grids are presented. For example, the selection of grids shown in FIG. 11B may be presented to the user.

In step 408 the user selects the grid corresponding to the one in which he had previously established his password. For example, if the user had previously established his password using grid 754, then the user again selects grid 754. The user may also be allowed to select the size of the grid if applicable.

FIG. 9 illustrates an example input user interface 510 having an input matrix 520 and a user name input field 530. In this example, the user has already selected matrix 520 in which to enter his or her password. Of course, it is not strictly necessary that the user select a grid to begin with; there may be a default grid that is always presented to the user. In step 412 the user enters his or her user name in field 530. In addition, the user may be prompted to enter the name of a particular application in the embodiment in which the user is authenticating himself to a particular application.

Figure 10:
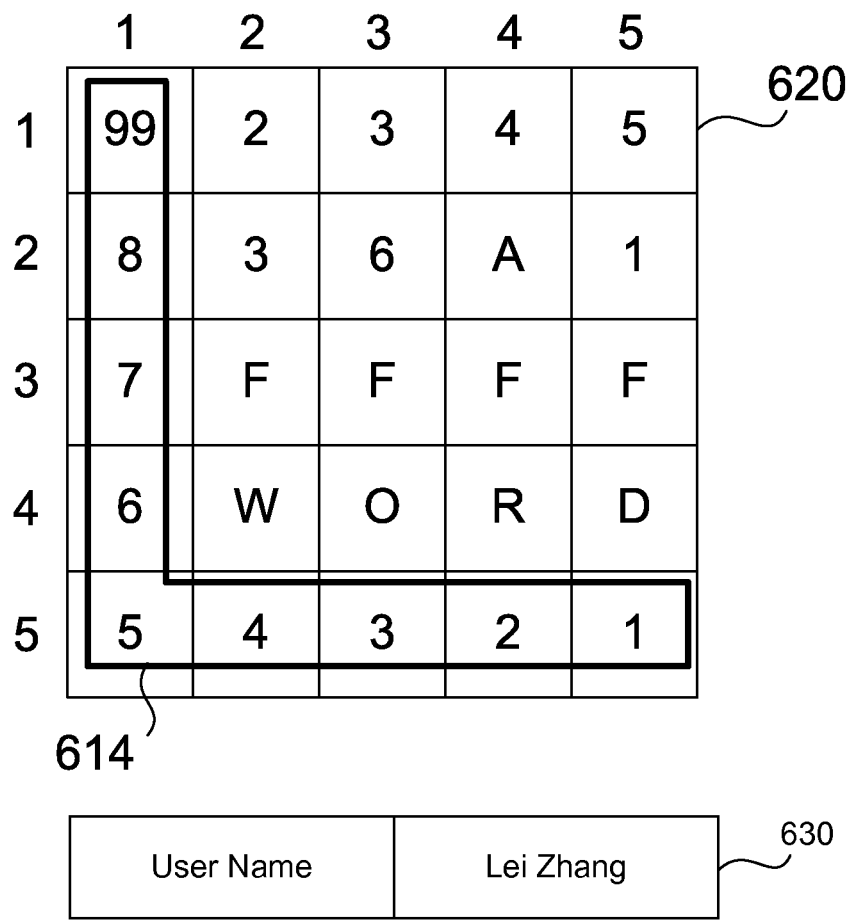
FIG. 10 illustrates the example input user interface after the user has entered his or her information.

In this example matrix 520 is shown as having all of its cells filled in with characters and numbers; it is possible to present a blank matrix to the user as well, or a matrix that is partially filled in. In this example, the user will generate the associated pattern by way of inputting their password into matrix 520. FIG. 10 illustrates the example input user interface 610 after the user has entered his or her information. In step number 416 the user preferably enters his or her password into matrix 620 according to the pattern he or she has previously generated. As shown, matrix 620 now includes the password "9987654321" in the form of pattern 614 which matches the previously generated pattern 224. By entering the password directly into matrix 620 in the form of the previously generated pattern the user provides the password and the pattern in a single step.

As shown, matrix 620 includes a variety of other random numerals, characters and symbols that are present in the matrix outside of pattern 614. These random numerals, characters and symbols may be present in matrix 520 when originally supplied to the user or may be filled in matrix 620 after the user has entered the password in pattern 614. If originally present in the matrix, the user may enter his or her password in pattern 614 by deleting any symbols present within the pattern and then replacing them with the correct password symbol. Or, the user interface may be designed such that it is easy for the user to overwrite any matrix cell when typing the password into pattern 614.

Although not strictly necessary, the random symbols, letters and characters present in matrix 620 outside of pattern 614 provide additional security to the user. If matrix 620 is input to the computing device or transmitted to a remote computer server having only pattern 614 containing the password and the rest of the matrix cells blank, it is possible for a hacker to intercept that matrix and immediately capture the pattern and password. By filling in random characters, numerals and symbols into the rest of the matrix outside of the pattern, it becomes more difficult for a hacker to discover the pattern of password. In fact, the extra numerals, characters and symbols need not be random but may be determined beforehand, and in fact, some of the matrix elements may be blank. Preferably, the extra numerals, characters and symbols are from the same password space as the password itself. Thus, if a password is constrained to be only digits and the 26 lowercase letters, then the extra numerals and characters in the input matrix will also be selected from that set of 36 digits and letters. Restricting the extra numerals, characters and symbols in this way provides extra security for the user's password present in the matrix.

In step 420 the user name and input matrix 620 are supplied to the local computing device 820 or to a remote computer server 840 for authentication. Once this information has been input by the user then the local computing device or the remote computer server is able to perform authentication. In one particular embodiment, the password in the input matrix 620 is encoded as described above and is shown in FIG. 12. The encoded result is preferably sent from the computing device to the remote computer server, although it is possible for the remote computer server to accept the input matrix and to perform the encoding itself.

In step 424 the local computing device or a remote computer server retrieves the previously stored information associated with the user's user name. As is known in the art, the user name may be used as a key into a database 830 or 860 to retrieve the previously stored password for that user name and the associated set of grid elements which define the associated pattern. For example, the previously stored password may be stored using an encoding scheme as described in the FIG. 12. Optionally, an application name may also be used to retrieve the stored password for the user name. Alternatively, an image of the pattern in the matrix may be retrieved in order to define the grid elements, or the retrieved image of the pattern may be compared directly to an image of the pattern in the input matrix 620.

In step 428 the information pertaining to the password input into the input grid is obtained. As mentioned, a variety of techniques may be used to encode or store the password that the user inputs for authentication. In one embodiment, the input password is encoded as described with respect to FIG. 12 and it is this encoded result which is used to compare to the previously stored password. In step 432 the two encoded passwords are compared and a match is determined in step 436. Alternatively, the password that the user has input is retrieved from input matrix 620 using the set of defined matrix elements that have been previously stored in the database 830 or 860. For example, using the previously stored set of matrix elements that define pattern 224, the input password in pattern 614 is retrieved from input matrix 620. This retrieved password from pattern 614 is then compared with the user's password previously stored in database 830 or 860.

In step 440 it is determined that the user has been authenticated and the user is permitted to log on to the computing device or to the remote computer server or online service. In step 444 it is determined that an invalid login attempt has occurred and that authentication has failed. A suitable warning message or alert is then generated and displayed or sent to the user, and displayed or sent to the computing device, system administrator, or remote computer server or online service.

Alternative Coordinate System

As mentioned above, even though a rectangular grid is shown as being used for generating a pattern, such a grid may be in any shape and may use any coordinate system. FIG. 11A shows an alternate coordinate system that may be used with an embodiment of the invention. In this example, the password "TROUT" is shown as occupying certain elements 722-729 of this coordinate system. A simple coordinate system may be used as shown for each element as defined by its distance from the center and its position on a circle. For example, element 724 which holds the character "R" is defined by the notation (2-1) because the element is in the second ring from the center and is in the first position of that circular ring. Or, a polar coordinate system may be used where, for example, element 726 holding the character "O" may be defined by the angle of 60° and a distance of "3" units from the center. Of course, many other shapes, coordinate systems and notations may be used to define patterns in two dimensions. In general, the term grid may be used to refer to any two-dimensional area such as a matrix, circular area, polar coordinate system, or other that may accommodate and identify a user's pattern.

System Embodiment

Figure 13:
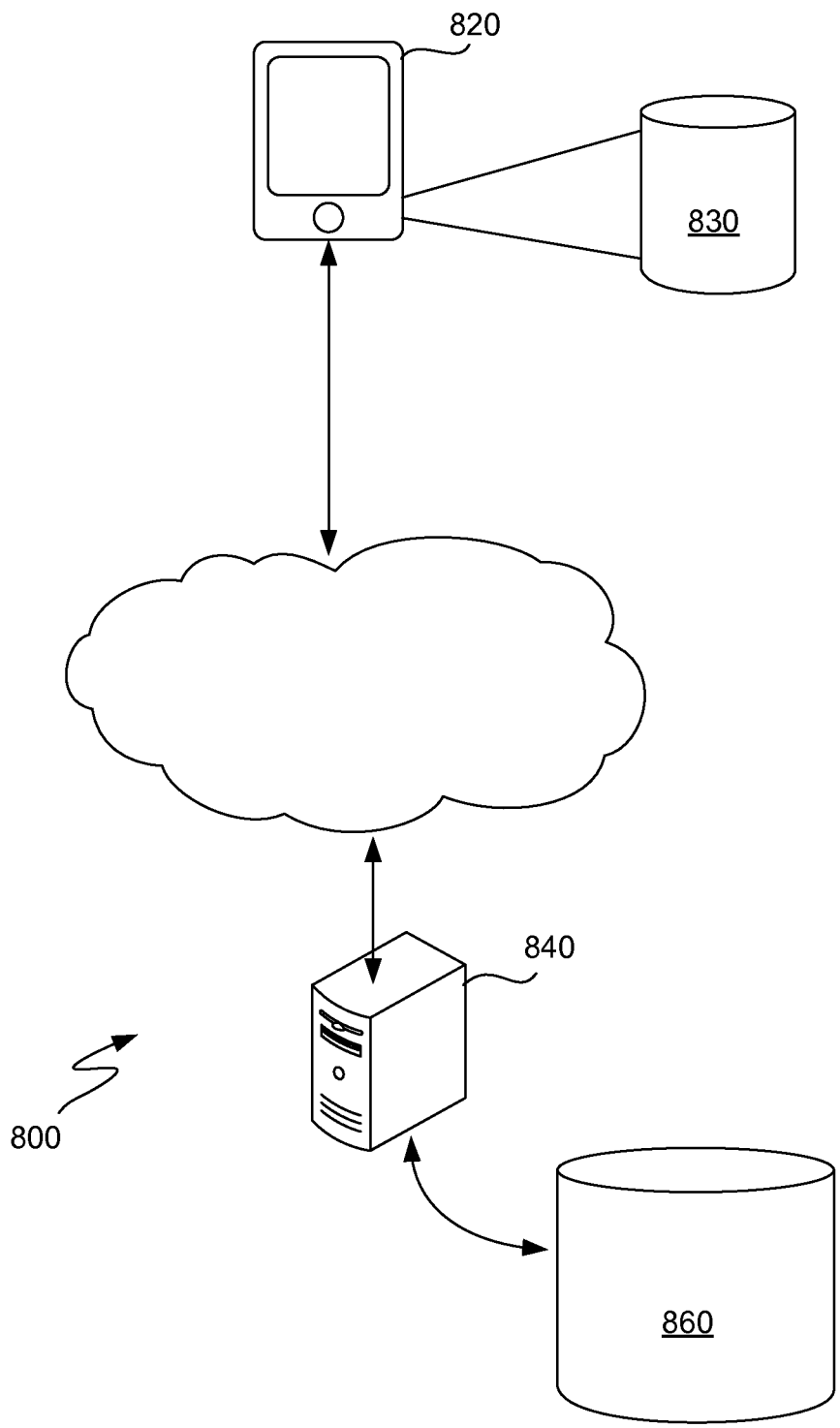
FIG. 13 illustrates a system embodiment of the invention.

FIG. 13 illustrates a system embodiment of the invention 800. Shown is a local computing device 820 having associated persistent storage 830. The device may also be in communication over the Internet with a remote computer server 840. The computer server may implement any type of online service that requires authentication, or the server may itself provide an authentication service for another Web site. Server 840 has associated storage 860 having a database of information such as user names associated with their respective patterns and passwords.

Computer System Embodiment

Figure 14A:
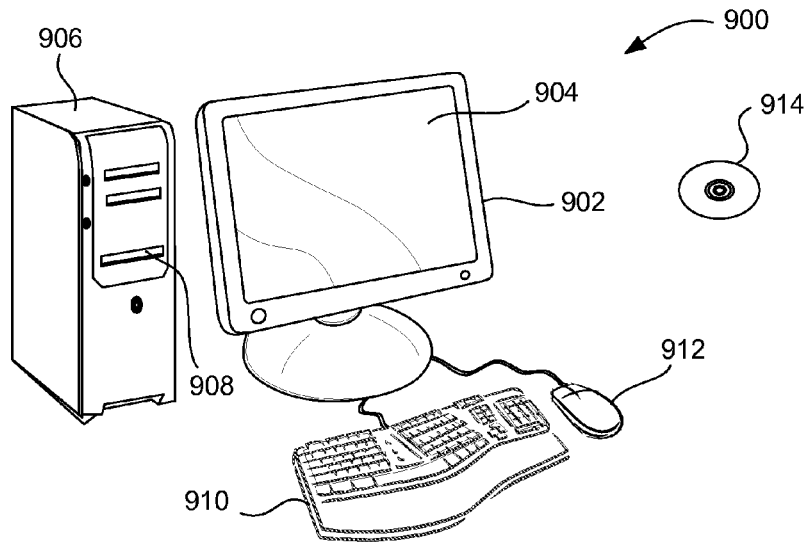
FIGS. 14A and 14B illustrate a computer system suitable for implementing embodiments of the present invention.
Figure 14B:
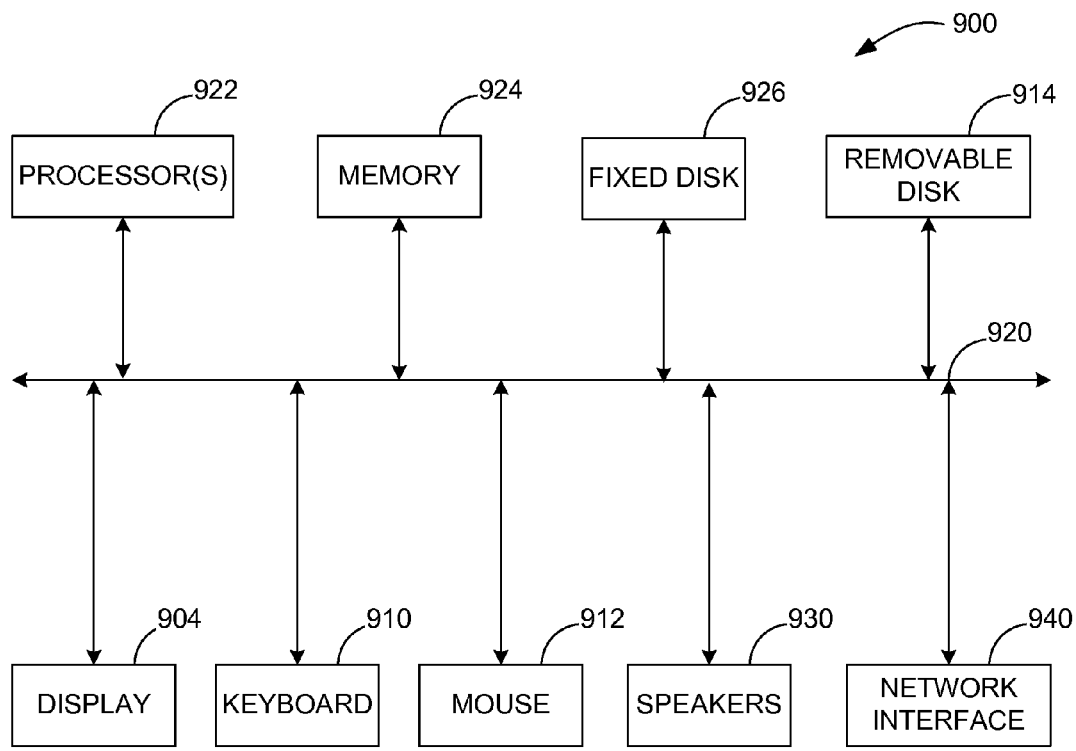

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of establishing a user identity, said method comprising:
    creating, by a computer user, a two-dimensional pattern on a display of a computing device, said pattern including a plurality of cells;
    receiving, on said computing device, a series of alphanumeric characters forming a password from said computer user entered into said cells of said two-dimensional pattern manually by said computer user, wherein at least one of said cells includes a plurality of said characters of said password, and wherein said characters forming said password do not appear in said cells before entry by said computer user and are found on a keyboard or input screen;
    determining a set of coordinates that define said pattern;
    receiving, on said computing device, a unique identifier from said computer user; and
    storing said set of coordinates, said unique identifier and said password in association with one another in persistent storage, whereby said identity of said computer user may be later authenticated.

2. The method as recited in claim 1 further comprising:
    presenting to said computer user on said computing device a plurality of grids;
    receiving a selection from a user indicating a chosen one of said grids; and
    receiving said password entered into said two-dimensional pattern into said chosen grid.

3. The method as recited in claim 1 wherein said password is entered on said display in order to generate said pattern.

4. The method as recited in claim 1 wherein said password is composed of symbols.

5. The method as recited in claim 1 wherein said password is composed of alphanumeric characters.

6. The method as recited in claim 1 wherein said two-dimensional pattern is generated within a grid on said display of said computing device, and wherein said set of coordinates defines locations of said cells of said matrix.

7. A method of authenticating a user, said method comprising
    displaying, on a computing device, a two-dimensional grid having individual cells;
    receiving input from a user of said computing device that defines a pattern within said grid including a pattern set of said cells;
    receiving a series of alphanumeric characters forming a password input from said user on said computing device, said password being input into said pattern set of cells manually by said user, wherein at least one cells of said pattern set includes a plurality of said characters of said password, and wherein said characters forming said password do not appear in said cells before entry by said user and are found on a keyboard or input screen;
    receiving a unique identifier from said user on said computing device; and
    authenticating said user using said pattern, said password and said unique identifier.

8. The method as recited in claim 7 further comprising:
    presenting to said computer user on said computing device a plurality of grids;
    receiving a selection from a user indicating a chosen one of said grids; and
    receiving said password entered into said pattern in said chosen grid.

9. The method as recited in claim 7 further comprising:
    receiving said password as being input into said grid, said password defining said pattern on said grid.

10. The method as recited in claim 9 further comprising:
    filling individual cells of said grid with symbols of a password space of said password, except for those individual elements holding said input password.

11. The method as recited in claim 10 further comprising:
    transmitting, over a network connection, said grid including said symbols and said password, and said user identifier, to a computer server where said authenticating is performed.

12. The method as recited in claim 7 further comprising:
    authenticating said user by comparing said password to a stored password and by comparing said pattern to a stored pattern.

13. The method as recited in claim 7 further comprising:
    encoding said password, said pattern and said unique identifier into an encoded string; and
    authenticating by said user by comparing said encoded string to a similarly encoded stored encoded string.

14. A method of authenticating a user, said method comprising:
    receiving a two-dimensional grid having individual cells from a computing device, wherein a plurality of said cells include alphanumeric characters, wherein at least one of said cells includes a plurality of characters, wherein said characters having been entered manually into said computing device by a computer user, and wherein said characters do not appear in said cells before entry by said computer user and are found on a keyboard or input screen;
    receiving a unique identifier that is associated with said grid from said computing device;
    retrieving a previously stored pattern from persistent storage using said unique identifier as a key;
    retrieving a previously stored password from persistent storage using said unique identifier as a key;
    using said stored pattern, selecting symbols from said grid that correspond to said stored pattern, said selected symbols forming an input password;
    comparing said input password to said previously stored password; and
    authenticating said user when said input password matches said previously stored password.

15. The method as recited in claim 14 wherein said received grid includes elements having symbols other than elements of said grid that correspond to said previously stored pattern.

16. The method as recited in claim 14 further comprising:
    selecting symbols from said grid by superimposing an image of said previously stored pattern onto said grid.

17. The method as recited in claim 14 further comprising:
retrieving, from said persistent storage, a set of coordinates defining said previously stored pattern;
selecting symbols from said grid by using said set of coordinates.

18. The method as recited in claim 14 further comprising:
receiving said two-dimensional grid from said user, wherein said user has input at least a portion of said symbols of said grid in order to authenticate said user.

19. The method as recited in claim 14 further comprising:
displaying on said computing device an indication that said user has been authenticated.

20. The method as recited in claim 14 wherein said symbols are alphanumeric characters.

* * * * *